Aug. 13, 1929.  A. J. PETERSON  1,724,307
OUTLET LOCATOR
Filed March 14, 1925

Witnesses:

Inventor:
Abdel John Peterson,
By Joshua R H Cottle
his Attorney

Patented Aug. 13, 1929.

1,724,307

UNITED STATES PATENT OFFICE.

ABDEL JOHN PETERSON, OF CHICAGO, ILLINOIS.

OUTLET LOCATOR.

Application filed March 14, 1925. Serial No. 15,675.

My invention relates to outlet locators, especially adapted for use in connection with outlet boxes and covers, and my invention has for its main object the provision of an improved device of this character which will be highly efficient in use and economical in manufacture.

Other objects will appear hereinafter.

The invention consists in the combinations and arrangements of parts hereinafter described and claimed.

The invention will be best understood by reference to the accompanying drawing forming a part of this specification, and in which, Fig. 1 represents a fragmental section through a wall, showing my outlet locator associated with an outlet box and cover arranged in the wall;

Figure 1:
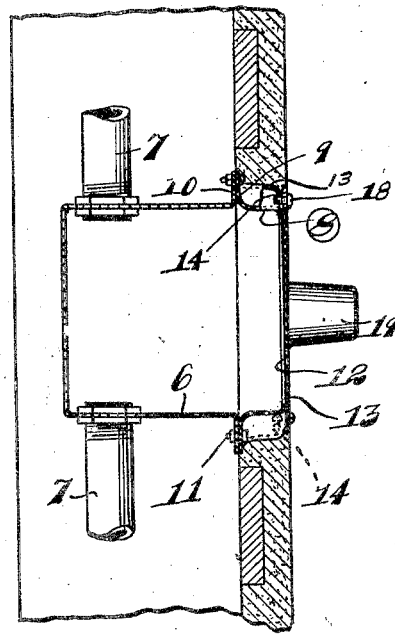
Figure 2:
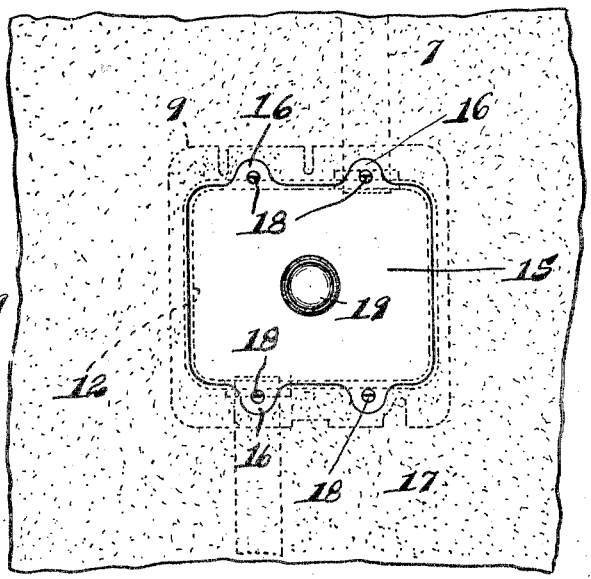
Fig. 2 represents a face view of the parts shown in Fig. 1.

With more particular reference to the parts illustrated in the accompanying drawing, 6 represents an outlet box adapted to be arranged in the walls of rooms, in partitions and in other similar places, to afford a suitable container for the electric switch and wires. 7 denotes the customary conduits which lead through the wall to the outlet box. Associated with the outlet box is the usual box cover 8, flanged as at 9 to cooperate with the flange 10 of the outlet box. The cooperating flanges 9 and 10 are secured together by bolts 11 or other equivalent means. The cover 8 has an opening 12 therein and projecting laterally from the walls surrounding the opening are spaced lugs 13 provided with the usual bolt receiving openings 14. The parts so far described may consist of standardized fittings of the type usually employed in connection with outlets.

The preferred embodiment as illustrated in the accompanying drawing, includes a plate 15 of a size to close the cover opening 12 and to fit flat upon the wall surrounding said opening. This plate is made with lugs 16 corresponding with the lugs 13 of the cover and designed to fit flat thereon. Said lugs 16 are also provided with bolt receiving apertures 17 designed to register with the corresponding holes of the lugs 13. Bolt members as 18 are passed through the cooperating lugs 16 and 13 for securing the plate 15 to the cover 8. Projecting outwardly for a distance from the face of the plate 15 is a locator member 19 which serves as a marker to show precisely where the outlet box is embedded in the wall. The locator member is preferably cast with the plate and is knob-like in form as shown in the drawing.

By those familiar with this art it will be understood that the outlet boxes and covers therefor are usually fixed in position before the wall is finished by surfacing it with materials such as plaster or concrete. During the plastering or concreting operations, portions of the material employed enter through the cover opening 12 and are deposited in the outlet box, frequently finding their way into the conduits 7. Sometimes it happens that the cover openings as 12 will be practically plastered over by the workmen. As a consequence, considerable trouble arises from the foreign material which thus enters the conduit and the expenditure of considerable time and labor is involved to remove the obstructions. My improved outlet locator is applied to the outlet cover before the plastering or other similar operations are commenced, so that no foreign matter can find its way into the outlet box and the conduits. If the plaster or other material is smeared upon the plate 15, as is generally the case, it is immaterial since the locator member 19 will show precisely where the outlet box is located.

Figure 4:
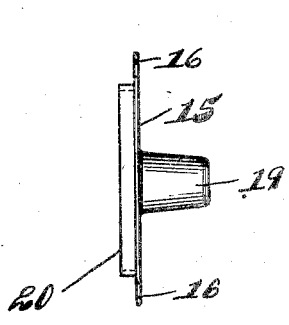
Fig. 4 shows an edge elevational view of a modified form of outlet locator.
Figure 5:
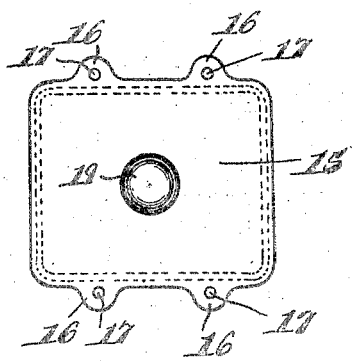
Fig. 5 shows a face view of the modified form of outlet locator.
Figure 3:
Fig. 3 shows an outlet locator detached from the outlet box cover.

In Figs. 4 and 5, I illustrate a modified form of outlet locator, in which the plate 15 is provided with a flange 20 designed to enter the opening 12 of the cover and to fit snugly along the edge surrounding said opening.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. In an outlet box having lugs with perforations a cover and locating-signal therefor, comprising a plate having lugs provided with perforations registering with the perforations of the outlet box whereby the plate is adapted to close the open end of the outlet box while the wall in which the box is mounted is being plastered or otherwise completed, said plate being constructed when mounted on the outlet box to lie substantially flush with the surface of the finished wall surrounding the box, the plate having an outstanding integral thimble-like projection of sufficient proportions to be visible after completion of the plastering of the wall, and said projection being located to leave the edges of the plate free of obstructions in the path of the strokes of the plasterer's tool past the line of contact of the wall with the edges of the plate.

2. In an outlet box having lugs with perforations, a cover and locating-signal therefor, comprising a substantially flat plate having an integral lateral thimble-like projection extending at one place only from the exposed face of the plate, and located remote from the edges of the plate, the plate being otherwise formed and proportioned to lie substantially flush with the finished wall surface about the engaged outlet box while the plate is in position for closing the open face of the box.

3. A cover and locating-signal for outlet boxes, comprising a substantially flat plate having integral lugs with perforations, whereby the plate is adapted to be detachably attached to the open face of an outlet box having integral lugs provided with perforations registering with the perforations of the plate, and an integral outstanding thimble-like button projecting from the exposed face of the plate and located remote from the edges of the plate, and the plate being otherwise formed and proportioned to lie substantially flush with the finished wall surface about the engaged outlet box.

4. In an outlet box having integral lugs with perforations, a cover for said box, said cover having lugs with perforations registering with those of the said outlet box, said cover comprising a plate having an outstanding integral thimble-like projection, said plate lying substantially flush with the surface of the finished wall surrounding the box, and means to secure said box and cover together.

In testimony whereof I have signed my name to this specification.

ABDEL JOHN PETERSON.